(12) United States Patent  
Guan et al.

(10) Patent No.: US 7,292,762 B2  
(45) Date of Patent: Nov. 6, 2007

(54) HOLE-ASSISTED HOLEY FIBER AND LOW BENDING LOSS MULTIMODE HOLEY FIBER

(75) Inventors: Ning Guan, Sakura (JP); Katsuhiro Takenaga, Sakura (JP); Katsuaki Izoe, Sakura (JP); Kazuhiko Aikawa, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 79 days.

(21) Appl. No.: 11/178,477

(22) Filed: Jul. 12, 2005

(65) Prior Publication Data

US 2006/0034574 A1   Feb. 16, 2006

(30) Foreign Application Priority Data

Jul. 13, 2004   (JP)   ............................ P2004-205819  
Sep. 27, 2004   (JP)   ............................ P2004-279453

(51) Int. Cl.  
*G02B 6/032*   (2006.01)

(52) U.S. Cl. ...................... 385/125; 385/123; 385/95; 385/122; 385/141

(58) Field of Classification Search ................ 385/122, 385/123, 124, 125, 126, 127, 128, 141, 95, 385/96  
See application file for complete search history.

(56) References Cited

U.S. PATENT DOCUMENTS

| | | | | |
|---|---|---|---|---|
| 5,907,652 | A | 5/1999 | DiGiovanni et al. | ........ 385/125 |
| 6,512,871 | B2 * | 1/2003 | Kumel et al. | ................ 385/123 |
| 7,155,099 | B2 * | 12/2006 | Broderick et al. | ........... 385/125 |
| 2001/0055455 | A1 | 12/2001 | Hasegawa et al. | ........... 385/127 |
| 2005/0069269 | A1 * | 3/2005 | Libori et al. | ................ 385/125 |

(Continued)

FOREIGN PATENT DOCUMENTS

JP   11-142672 A   5/1999

(Continued)

OTHER PUBLICATIONS

Ning Guan, et al.: "Hole-Assisted Holey Fibers for Low Bending Loss"; IEICE Technical Report; vol. 104, No. 64; May 20, 2004; p. 27-30.

(Continued)

Primary Examiner—Brian M. Healy  
(74) Attorney, Agent, or Firm—Sughrue Mion Pllc.

(57) ABSTRACT

A hole-assisted holey fiber is provided. The holey fiber includes a core region; a cladding region around the core region, and a plurality of holes in the cladding region around the core region. The core region has a higher refractive index than that of the cladding region. The holes form an inner hole layer and an outer hole layer, and the inner hole layer has the same number of holes as the number of the holes in the outer hole layer. The outer layer holes are provided in locations in which inner holes are absent when viewed from the center of the core region, and holes defining the same layer have the same diameter. A distance $\Lambda_1$ from a center of the core region to a center of an inner hole and a distance $\Lambda_2$ from the center of the core region to a center of an outer hole satisfy the relationship $\Lambda_1 < \Lambda_2$, and a diameter $d_1$ of an inner hole and a diameter $d_2$ of an outer hole satisfy the relationship $d_1 \geq d_2$.

19 Claims, 12 Drawing Sheets

U.S. PATENT DOCUMENTS

2005/0157998 A1* 7/2005 Dong et al. .................. 385/126
2006/0034574 A1* 2/2006 Guan et al. .................. 385/125

FOREIGN PATENT DOCUMENTS

| JP | 2002-31737 A | 1/2002 |
| JP | 2004-226541 A | 8/2004 |
| WO | WO 02/084350 A1 | 10/2002 |

OTHER PUBLICATIONS

T. Hasegawa, et al, "Novel hole-assisted lightguide fiber exhibiting large anomalous dispersion and low loss below 1dB/km", Proc. OFC, PD5, 2001, no date.

B. Yao, et al., "Low-loss holey fiber," Proc. 53rd IWCS, pp. 135-139, 2004, no date.

T. Hasegawa, et al., "Bending-insensitive single-mode holey fibre with SMF-compatibility for optical wiring applications," ECOC-IOOC 2003 Proc., We2.73, 2003, no date.

* cited by examiner

HOLE-ASSISTED HOLEY FIBER AND LOW BENDING LOSS MULTIMODE HOLEY FIBER

CROSS-REFERENCE TO RELATED APPLICATIONS

Priority is claimed from Japanese Patent Application No. 2004-205819, filed Jul. 13, 2004, and Japanese Patent Application No. 2004-279453, filed Sep. 27, 2004, the contents of which are incorporated herein by reference.

BACKGROUND OF THE INVENTION

House wiring optical fibers used for the FTTH (fiber to the home) technique desirably have excellent bending loss characteristics when flexibility of laying cables and ease of installation are taken into consideration. Although improvement in bending loss characteristics can be achieved by increasing a relative refractive index difference between the core and cladding, an increased relative refractive index difference increases containment of higher-order modes, thereby making cut-off wavelengths in higher-order modes longer.

A hole-assisted holey fiber (HAHF) has been proposed as a significantly low-loss fiber compared to typical single-mode fibers (hereinafter abbreviated as "SMFs") used in an optical transmission path. A holey fiber is constructed such that a plurality of holes are disposed around its core, and it exhibits a larger relative refractive index difference between the core and the cladding and a lower bending loss characteristic even with small-diameter bending, as compared to conventional SMFs.

However, even through conventional holey fibers can achieve low bending loss, they cannot completely eliminate the tradeoff of a lower bending loss versus a longer cut-off wavelength (see T. Hasegawa, et al, "Novel hole-assisted lightguide fiber exhibiting large anomalous dispersion and low loss below 1 dB/km", Proc. OFC, PD5, 2001).

The following types of hole-assisted holey fibers (hereinafter referred to as HAHFs) have been proposed: one in which a plurality of holes are disposed around the core to form one layer of holes, as shown in FIG. 1 (see B. Yao, et al., "Low-loss holey fiber," Proc. 53rd IWCS, pp. 135-139, 2004, for example); and another in which a plurality of holes are disposed around the core to form two layers of holes, as shown in FIG. 2 (see T. Hasegawa, et al., "Bending-insensitive single-mode holey fiber with SMF-compatibility for optical wiring applications," ECOC-IOOC 2003 Proc., We2.7.3, 2003, for example).

The type of HAHF shown in FIG. 1 in which holes are arranged to form one layer includes a core 11, a cladding region 12 therearound, the core region having a higher refractive index than that of the cladding region 12, and a plurality (six in the example shown in the figure) of holes 13 provided in the cladding region 12 along a circle concentric around the core region 11. Each of the plurality of holes 13 has the same diameter, and the distances between the center of the core region and the centers of each of the holes 13 are all equal.

The type of HAHF shown in FIG. 2 in which holes are arranged to form two layers includes a core 11, a cladding region 12 therearound, the core region having a higher refractive index than that of the cladding region 12, six inner holes 14 provided in the cladding region 12 along a circle concentric around the core region 11, and twelve outer holes 15 provided outside from the inner holes 14. In the illustrated example, the inner holes 14 and the outer holes 15 are all formed to have the same diameter. Furthermore, in this HAHF, one-half of the outer holes 15 are arranged on lines extended from the center of the core region through the inner holes 14.

Among the above-described conventional HAHFs, although the HAHF shown in FIG. 1 has a simpler structure than the HAHF shown in FIG. 2, obtaining a fiber with a low bending loss $L_B$ and a short cut-off wavelength $\lambda_C$ is limited by a trade-off. More specifically, in order to reduce the bending loss $L_B$, the diameter of the holes should be enlarged so that the ratio of the space occupied by the holes in the cladding region is increased. On the other hand, in order to reduce the cut-off wavelength $\lambda_C$, containment of higher-order modes should be minimized. For this purpose, the space occupancy ratio should be reduced or the holes should be disposed closer to the core region. However, in the structure as shown in FIG. 1, since disposing the holes closer to the core region results in an increased space occupancy ratio, it becomes difficult to achieve both a low bending loss $L_B$ and a short cut-off wavelength $\lambda_C$.

Furthermore, since the HAHF shown in FIG. 2 has the second layer of the holes outside from the holes in the fiber shown in FIG. 1, it permits more flexibility in adjusting the bending loss and the cut-off wavelength than the HAHF shown in FIG. 1. However, a large number of holes, i.e., 18, and a relatively complex structure of this fiber may cause increased production cost.

BRIEF SUMMARY OF THE INVENTION

It is an aspect of the present invention to provide a high-performance HAHF that realizes both a low bending loss $L_B$ and shorter cut-off wavelength $\lambda_C$, and to provide a low-bending loss multimode holey fiber that is suitable as an optical fiber for house wiring that is associated with bending with low curvature.

One exemplary exemplary embodiment of the present invention provides a hole-assisted holey fiber, comprising: a core region; a cladding region provided around the core region; and a plurality of holes that are provided in the cladding region around the core region, wherein a refractive index of the core region is higher than that of the cladding region, the holes form two layers comprising an inner hole layer and an outer hole layer, the inner hole layer has the same number of holes as the number of the holes in the outer hole layer, the outer holes are provided in locations in which holes are absent when viewed from the center of the core region, holes defining the same layer have the same diameter, a distance $\Lambda_1$ from a center of the core region to a center of an inner hole and a distance $\Lambda_2$ from the center of the core region to a center of an outer hole satisfy $\Lambda_1 < \Lambda_2$, and a diameter $d_1$ of an inner hole and a diameter $d_2$ of an outer hole satisfy $d_1 \leq d_2$.

Another exemplary embodiment of the present invention provides a hole-assisted holey fiber, comprising: a core region; a cladding region provided around the core region; and a plurality of holes that are provided in the cladding region around the core region, wherein a refractive index of the core region is higher than that of the cladding region, the holes define two or more layers comprising an inner hole layer and an outer hole layer, a distance $\Lambda_i$ from a center of the core region to a center of an inner hole and a distance $\Lambda_j$ from the center of the core region to a center of an outer hole satisfy $\Lambda_i < \Lambda_j$, and a diameter $d_i$ of an inner hole and a diameter $d_j$ of an outer hole satisfy $d_i \leq d_j$ (where "i" and "j" are ascending numeric orders of the hole layers counted from the center, and i<j), the outer holes are provided in locations in which holes are absent when viewed from the center of the core region, and holes defining the same layer have the same diameter.

Yet another exemplary embodiment of the present invention provides a holey fiber comprising: a core region; a cladding region; and a plurality of holes surrounding the core region, wherein the core region has a higher refractive index than that of the cladding region, the core region comprises a first core at a center that is made of a material having a higher refractive index than that of the cladding region, and a second core around the first core, which is made of a material having a refractive index that is different from a refractive index of the first core and higher than that of a material of the cladding region.

BRIEF DESCRIPTION OF THE DRAWINGS

Aspects of the present invention will become more apparent by describing in detail exemplary embodiments thereof with reference to the accompanying drawings in which.

DETAILED DESCRIPTION OF EXEMPLARY EMBODIMENTS OF THE INVENTION

Hereinafter, various exemplary embodiments of the present invention will be described with reference to the drawings.

Figure 3:
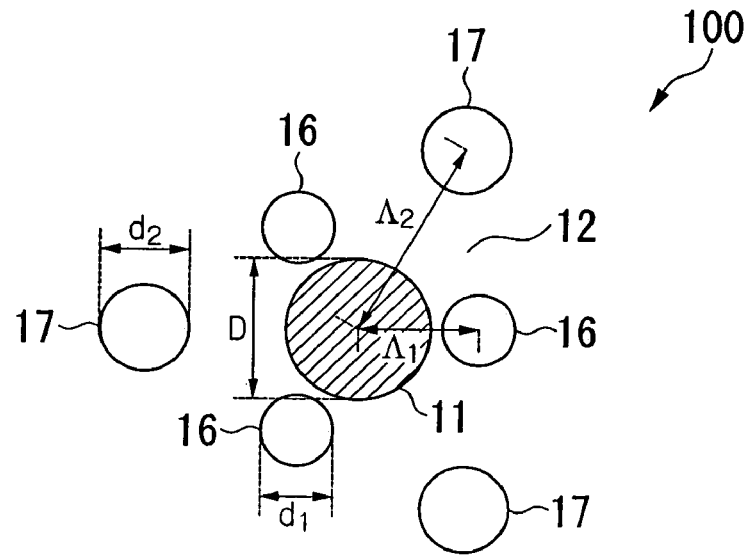
FIG. 3 is a cross-sectional view illustrating a first exemplary embodiment of an HAHF according to the present invention.

FIG. 3 is a cross-sectional view illustrating an HAHF 100 of a first exemplary embodiment of an HAHF according to the present invention. In this figure, reference numeral 11 denotes a core region, reference numeral 12 denotes a cladding region, reference numerals 16 denote inner holes, and reference numerals 17 denote outer holes.

This HAHF 100 is constructed to include the core region 11, the cladding region 12 therearound, the core region 11 having a higher refractive index than that of the cladding region 12, and the holes 16 and 17 defining two layers including the inner and outer layers provided in the cladding region 12 surrounding the core region 11. The core region 11 is formed from a silica-based glass material, such as silica glass doped with $GeO_2$, for example, and the cladding region 12 is formed from a material having a lower refractive index than that of the material of the core region 11, for example, silica glass.

The inner hole layer (first layer) includes three inner holes 16 and the outer hole layer (second layer) includes three outer holes 17. The inner holes 16 and the outer holes 17 are each arranged in a circular shape. The three inner holes 16 have the same diameter, and the outer holes 17 also have the same diameter. The outer holes 17 are arranged at positions at which no inner holes 16 are arranged when viewed from the center of the core region 11.

The relationship between distance $\Lambda_1$ between the center of the core region 11 and the center of the inner holes 16 and the distance $\Lambda_2$ between the center of the core region 11 and the center of the outer holes 17 is $\Lambda_1 < \Lambda_2$, and the relationship between the diameter $d_i$ of the inner holes and the diameter $d_2$ of the outer holes is $d_1 < d_2$. These values, i.e. $\Lambda_1$, $\Lambda_2$, $d_1$, and $d_2$, may appropriately be selected according to various parameters, such as the diameter D of the core region, the relative refractive index difference $\Delta$, or the like.

Although it is not a limitation, if a fiber having the diameter of the core region of between about 4 and about 10 μm is used, it is preferable that $\Lambda_1$ be between about 3 and about 9 μm, $\Lambda_2$ be between about 5 and about 15 μm while maintaining $\Lambda_1 < \Lambda_2$, and $d_1$ be between about 2 and about 8 μm, and $d_2$ be between about 4 and about 12 μm while maintaining $d_1 \leq d_2$, for example.

In this HAHF 100, the inner holes 16 are provided closer to the core region 11 without increasing the space occupancy ratio of the holes in the vicinity of the core region 11 by arranging respective holes so that the inner holes 16 have a smaller diameter while the outer holes 17 have a larger diameter, and by reducing the numbers of respective holes. As a result, since it is possible to reduce the equivalent refractive index of higher-order modes without containing the higher-order modes, a reduction in the cut-off wavelength $\lambda_C$ of the HAHF can be achieved. On the other hand, since the electromagnetic field of the fundamental mode is distributed in the same phase, light can be sufficiently contained in the core region 11 by surrounding the core region 11 with the large-diameter outer holes 17 and the small-diameter inner holes 16, thereby reducing bending loss $L_B$.

In the HAHF 100, it is preferable that the cut-off wavelength $\lambda_C$ of the HAHF in a higher-order mode be shorter than about 1.3 μm, and bending loss $L_B$ with a bending diameter φ of 10 mm at a wavelength of 1.55 μm be lower than about 2.5 dB/m.

Furthermore, in this HAHF, it is preferable that fusion splice loss with a single-mode fiber having a step-shaped core be about 0.2 dB or less at a wavelength of 1.55 μm, and mechanical splice loss be about 0.5 dB or less.

The above-described fusion splice loss is measured using the following procedure. First, a light source and a photodetector are connected together using an SMF, and an optical power $P_1$ that is detected is measured. Next, the SMF is cut, and a fiber to be measured in a length of several meters is fusion spliced between the two cut SMFs, and a detected optical power is measured as $P_2$. In this case, loss due to the fusion splice is given by $(P_1-P_2)/2$.

Furthermore, mechanical splice loss is similar to the above-described fusion splice loss, but is a value that is measured when fibers are mechanically spliced rather than fusion spliced.

Figure 4:
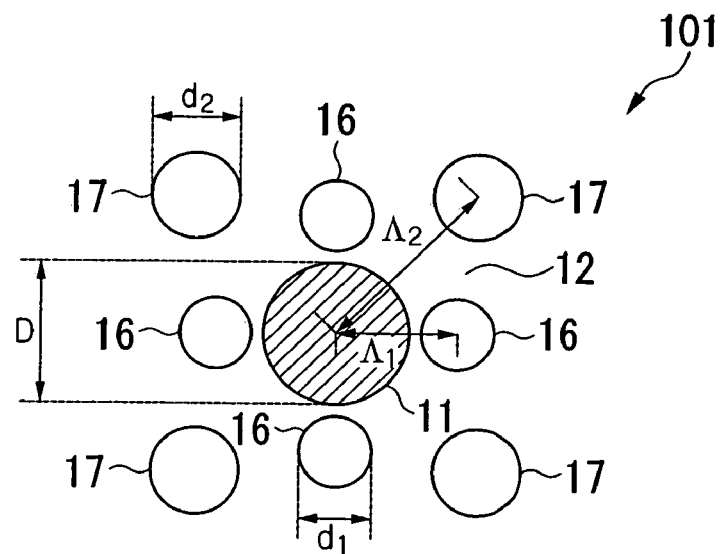
FIG. 4 is a cross-sectional view illustrating a second exemplary embodiment of an HAHF according to the present invention.

FIG. 4 is a cross-sectional view illustrating the principal portion of an HAHF 101 as a second exemplary embodiment of an HAHF 101 according to the present invention. The HAHF 101 of this exemplary embodiment is structured to include elements similar to those of the HAHF 100 of the above-described first exemplary embodiment, and the same reference numerals are given to like elements.

While the inner hole layer and the outer hole layer are respectively composed of three holes in the HAHF 100 of the above-described first exemplary embodiment, the inner hole layer and the outer hole layer are respectively composed of four holes in the HAHF 101 of this exemplary embodiment.

The HAHF 101 of this exemplary embodiment is capable of providing the same effects as those of the HAHF 100 of the above-described first exemplary embodiment provided that the diameter of the inner holes 16 is small.

Figure 5:
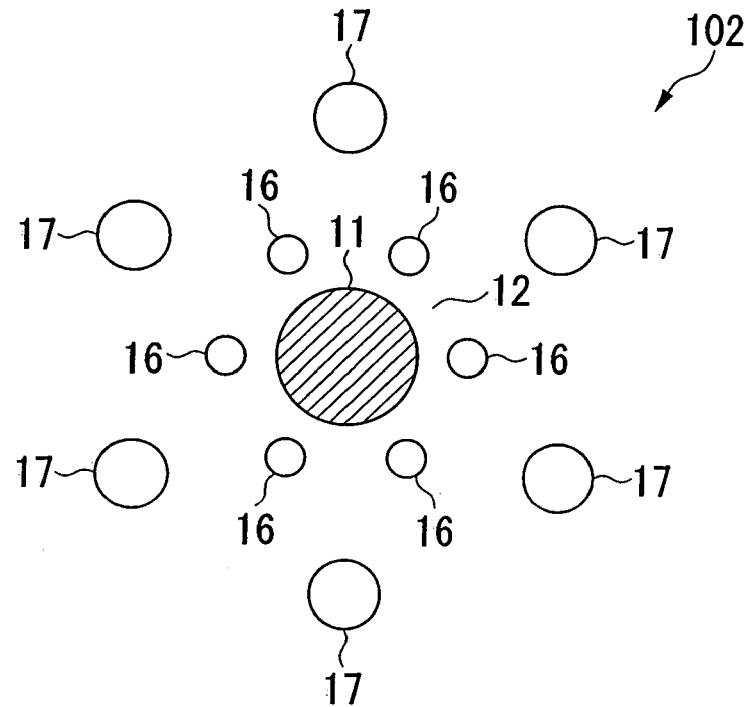
FIG. 5 is a cross-sectional view illustrating a third exemplary embodiment of an HAHF according to the present invention.

FIG. 5 is a cross-sectional view illustrating an HAHF 102 of a third exemplary embodiment according to the present invention. The HAHF 102 of this exemplary embodiment is structured to include elements similar to those of the HAHF 100 of the above-described first exemplary embodiment, and the same reference numerals are given to like elements.

While the inner hole layer and the outer hole layer are respectively composed of three holes in the HAHF 100 of the above-described first exemplary embodiment, the inner hole layer and the outer hole layer are respectively composed of six holes in the HAHF 102 of this exemplary embodiment.

The HAHF 102 of this exemplary embodiment is capable of providing the same effects as those of the HAHF 100 of the above-described first exemplary embodiment provided that the diameter of the inner holes 16 is small.

Figure 6:
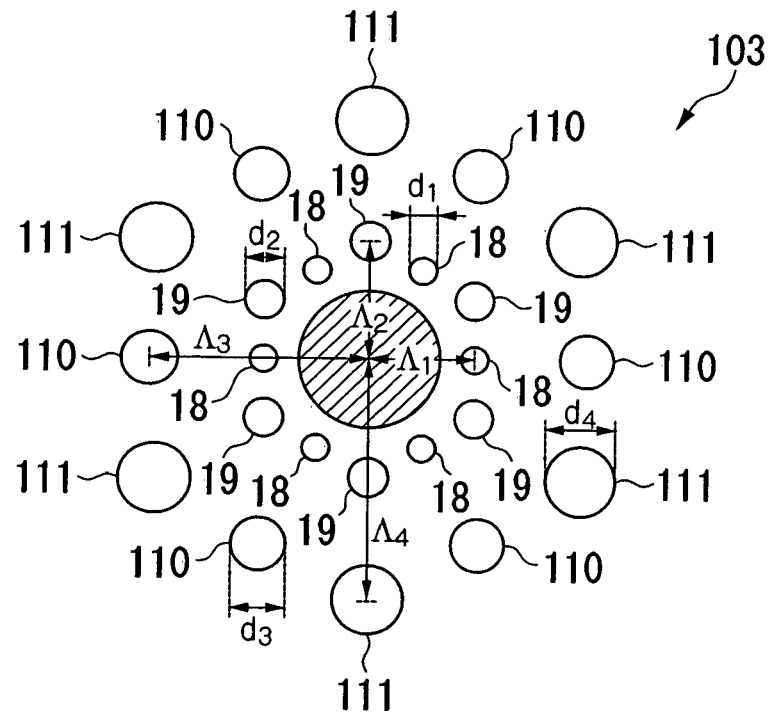
FIG. 6 is a cross-sectional view illustrating a fourth exemplary embodiment of an HAHF according to the present invention.

FIG. 6 is a cross-sectional view illustrating an HAHF 103 of a fourth exemplary embodiment according to the present invention. The HAHF 103 of this exemplary embodiment has the same structures of the core region 11 and the cladding region 12 as those of the HAHF 100 of the above-described first exemplary embodiment, but this exemplary embodiment is characterized in that four hole layers are provided around the core region 11.

The holes of the HAHF 103 in this exemplary embodiment include a first layer composed of six first layer holes 18 provided around the core region 11; a second layer composed of six second layer holes 19 that are provided between the first layer holes 18, and are arranged such that the centers of the second layer holes 19 are located a short distance from the centers of the first layer holes 18; a third layer composed of six third layer holes 110 that are provided on an extension of a line drawn from the center of the core region 11 to the center of the first layer holes 18; and a fourth layer composed of six fourth layer holes 111 that are provided between the third layer holes 110, and are arranged such that the centers of the fourth layer holes 111 are located a short distance from the centers of the third layer holes 110.

The distance $\Lambda_1$ from the center of the core region 11 to the center of a first layer hole 18, the distance $\Lambda_2$ from the center of the core region 11 to the center of a second layer hole 19, the distance $\Lambda_3$ from the center of the core region 11 to the center of a third layer hole 110, and the distance $\Lambda_4$ from the center of the core region 11 to the center of a fourth layer hole 111 satisfy the following relationship: $\Lambda_1 < \Lambda_2 < \Lambda_3 < \Lambda_4$. Furthermore, the diameter $d_1$ of the first layer holes 18, the diameter $d_2$ of the second layer holes 19, the diameter $d_3$ of the third layer holes 110, and the diameter $d_4$ of the fourth layer holes 111 satisfy the following relationship: $d_1 < d_2 < d_3 < d_4$.

These values, $\Lambda_1$ to $\Lambda_4$ and $d_1$ to $d_4$, may be set as appropriate according to parameters, such as the diameter D of the core region and relative refractive index difference Δ, and are not particularly limited. Taking a fiber having a diameter of the core region of between about 4 and about 10 μm, it is preferable that $\Lambda_1$ be between about 3 and about 6 μm, $\Lambda_2$ be between about 5 and about 9 μm, $\Lambda_3$ be between about 7 and about 12 μm, and $\Lambda_4$ be between about 10 and about 16 μm (provided that $\Lambda_1 < \Lambda_2 < \Lambda_3 < \Lambda_4$); and $d_1$, be between about 1 and about 5 μm, $d_2$ be between about 2 and about 6 μm, $d_3$ be between about 2.5 and about 7 μm, and $d_4$ be between about 3 and about 10 μm (provided that $d_1 \leq d_2 \leq d_3 \leq d_4$).

The HAHF 103 of this exemplary embodiment is capable of providing the same effects as those of the HAHF 100 of the above-described first exemplary embodiment. Although the HAHF of this exemplary embodiment has a more complex structure than the HAHF of the above-described exemplary embodiments, having increased layers of holes permits more flexibility in adjusting characteristics, such as a cut-off wavelength and bending loss, thereby enabling provision of an HAHF with higher performance.

EXAMPLE 1

An HAHF having holes that formed two layers, i.e., the inner and outer layers, around the core region, in which the respective numbers of holes in the inner and outer layers were three, as shown in FIG. 3, was fabricated. The core region was formed from silica glass doped with $GeO_2$, and the cladding region was formed from sure silica. The diameter D of the core region was 8.5 μm, and the relative refractive index difference Δ was 0.34%. For the inner hole layer, the hole diameter $d_1$ was 5.1 μm, and the distance $\Lambda_1$ from the center of the core region to the center of a hole was 8.5 μm. For the outer hole layer, the hole diameter $d_2$ was 8.5 μm, and the distance $\Lambda_2$ from the center of the core region to the center of the hole was 11.0 μm.

The characteristics of the fiber were measured as follows: a cut-off wavelength $\lambda_C$ of the HAHF was about 1.24 μm and bending loss $L_B$ with a bending diameter φ of 10 mm at a wavelength of 1.55 μm was about 1.97 dB/m. Furthermore, fusion splice loss with an SMF having a similar core (D=8.5 μm and Δ=0.34%) was about 0.05 db at a wavelength of 1.55 μm, and corresponding mechanical splice loss was about 0.30 dB.

EXAMPLE 2

An HAHF having holes that formed two layers, i.e., the inner and outer layers, around the core region, in which the respective numbers of holes in the inner and outer layers were four, as shown in FIG. 4, was fabricated. The same materials as in the HAHF of Example 1 were used for the core region and the cladding region. The diameter D of the core region was 8.5 μm, and the relative refractive index difference Δ was 0.34%. For the inner hole layer, the hole diameter $d_1$ was 3.6 μm, and the distance $\Lambda_1$ from the center of the core region to the center of a hole was 7.5 μm. For the outer hole layer, the hole diameter $d_2$ was 8.0 μm, and the distance $\Lambda_2$ from the center of the core region to the center of the hole was 13.0 μm.

The characteristics of the fiber were measured as follows: a cut-off wavelength $\lambda_C$ of the HAHF was about 1.28 μm and bending loss $L_B$ with a bending diameter φ of 10 mm at a wavelength of 1.55 μm was about 2.05 dB/m. Furthermore, fusion splice loss with an SMF having a similar core (D=8.5 μm and Δ=0.34%) was about 0.20 db at a wavelength of 1.55 μm, and corresponding mechanical splice loss was about 0.32 dB.

EXAMPLE 3

An HAHF having holes that formed two layers, i.e., the inner and outer layers, around the core region, in which the respective numbers of holes in the inner and outer layers were six, as shown in FIG. 5, was fabricated. The same materials as in the HAHF of Example 1 were used for the core region and the cladding region. The diameter D of the core region was 8.5 μm, and the relative refractive index difference Δ was 0.34%. For the inner hole layer, the hole diameter $d_1$ was 3.3 μm, and the distance $\Lambda_1$ from the center of the core region to the center of a hole was 6.8 μm. For the outer hole layer, the hole diameter $d_2$ was 6.8 μm, and the distance $\Lambda_2$ from the center of the core region to the center of the hole was 14.0 μm.

The characteristics of the fiber were measured as follows: a cut-off wavelength $\lambda_C$ of the HAHF was about 1.29 μm and bending loss $L_B$ with a bending diameter φ of 10 mm at a wavelength of 1.55 μm was about 1.70 dB/m. Furthermore, fusion splice loss with an SMF having a similar core (D=8.5 μm and Δ=0.34%) was about 0.19 db at a wavelength of 1.55 μm, and corresponding mechanical splice loss was about 0.27 dB.

EXAMPLE 4

Figure 1:
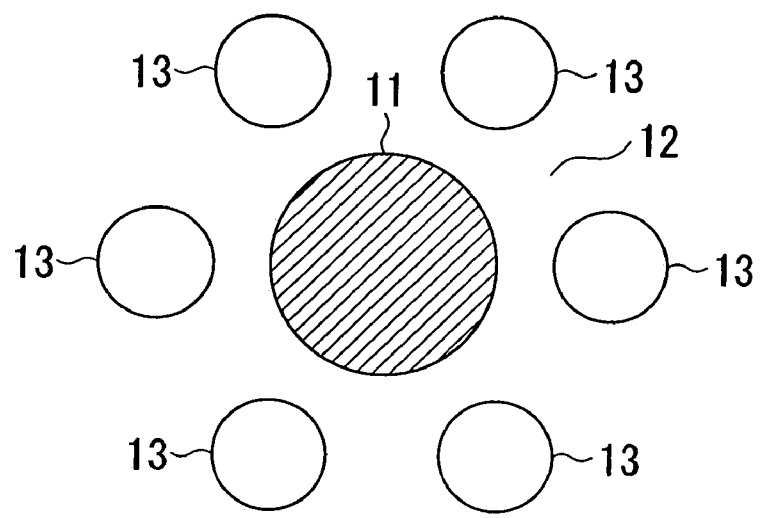
FIG. 1 is a cross-sectional view illustrating an HAHF as an example of a conventional HAHF.
Figure 2:
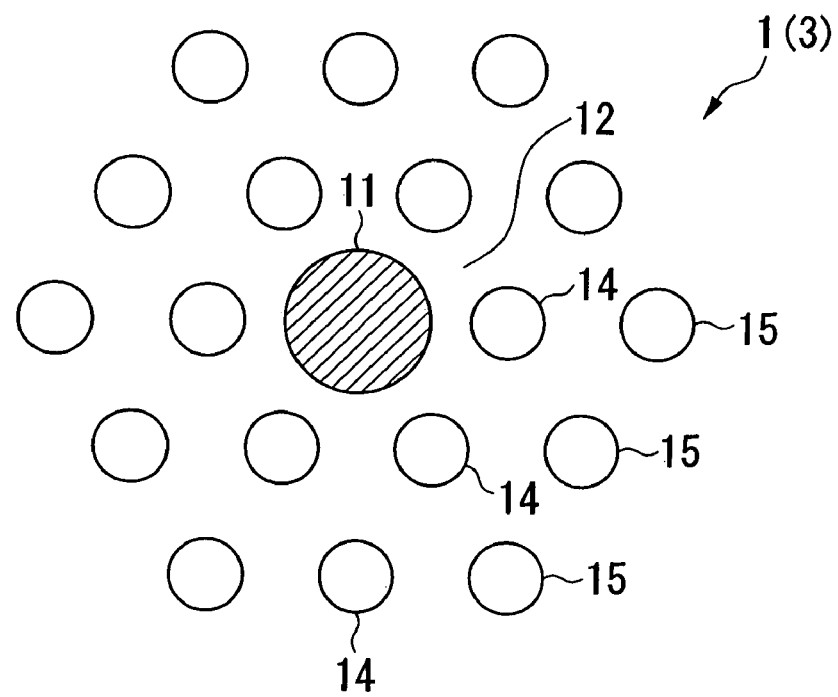
FIG. 2 is a cross-sectional view illustrating an HAHF as another example of a conventional HAHF.
Figure 7:
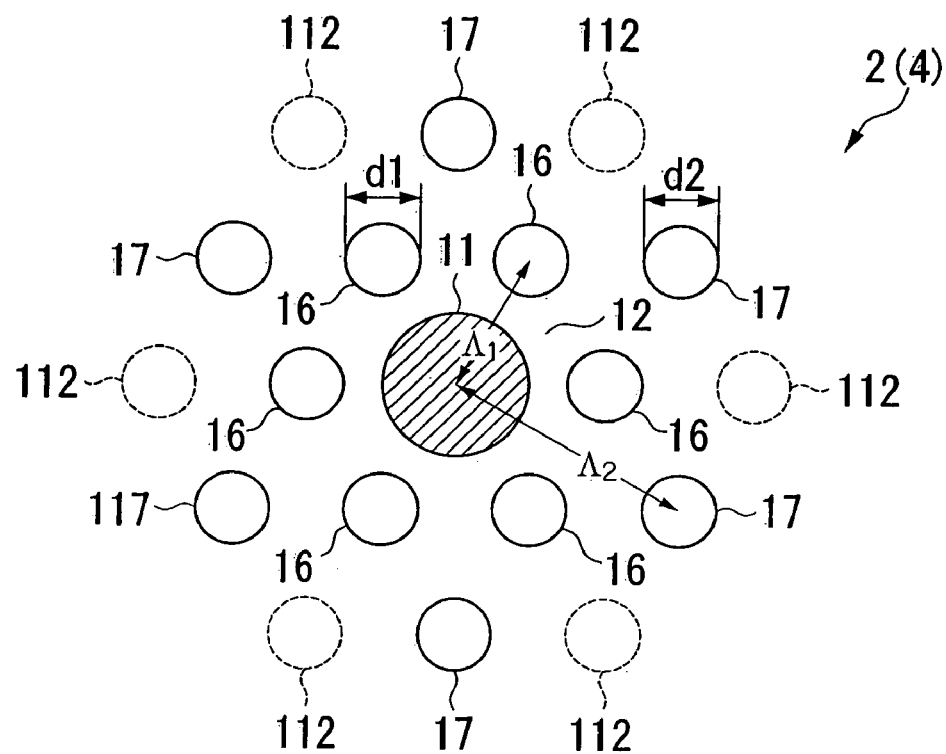
FIG. 7 is a cross-sectional view illustrating an HAHF made according to an exemplary embodiment of the present invention.

A fiber having the structure shown in FIG. 2 (Fiber 1) and another fiber having the structure shown in FIG. 7 (Fiber 2) were fabricated, which were similar except for the number of holes. Both Fibers 1 and 2 had a core region with a refractive index difference with respect to pure silica Δ of 0.34% and a diameter D of 8.0 μm, and holes with a diameter $d_1$ and $d_2$ of 4.2 μm, a distance $\Lambda_1$ between the center of an inner hole and the center of the core region of 7.2 μm, and a distance $\Lambda_2$ between the center of an outer hole and the center of the core region of 15.0 μm. Fiber 1 included six inner holes and 12 outer holes, having 18 holes in total, whereas Fiber 2 included six inner holes and six outer holes, having 12 holes in total. As shown in FIG. 7, the six outer holes of Fiber 2 were provided at regions in which inner holes are absent when viewed from the center of the core region. To aid in comparing Fiber 1 and Fiber 2, reference numerals 112 shown in FIG. 7 denote hole positions where the 12 outer holes of Fiber 1 would be placed.

Higher-order mode cut-off wavelengths were measured at about 1.21 μm for Fiber 1 and about 1.19 μm for Fiber 2, and bending loss with a bending diameter φ of 10 mm at a wavelength of 1.55 μm was measured at about 2.0 dB/m for Fiber 1 and about 2.2 dB/m for Fiber 2. The two fibers exhibited almost substantially similar optical characteristics.

Furthermore, fusion splice loss with an SMF having a conventional step-shaped core (D=8.5 μm and Δ=0.34%) was measured at about 0.08 dB in both cases, and mechanical splice loss with the same fiber was measured at about 0.22 dB at a wavelength of 1.55 μm in both cases. Return loss was measured at about 45 dB at a wavelength of 1.55 μm in both cases.

Furthermore, when two HAHFs were spliced, fusion splice loss was measured at about 0.11 dB in both cases and mechanical splice loss was measured at about 0.26 dB at a wavelength of 1.55 μm in both cases. Return loss was measured at about 45 dB or more in both cases.

That is, when Fiber 2 shown in FIG. 7 was formed by omitting six of the 12 outer holes, i.e. the holes aligned with the inner holes when viewed from the center of the core region in the 18-hole type fiber 1 shown in FIG. 2, the optical characteristics were not substantially affected.

Figure 8:
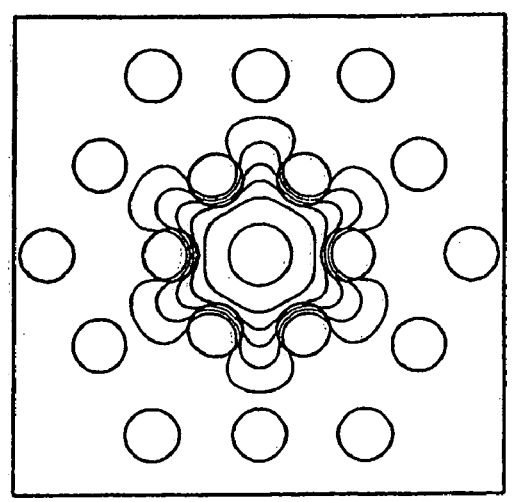
FIG. 8 is a graph showing power distribution of the fundamental mode of a conventional 18-hole type fiber at a wavelength of 1.55 µm.
Figure 9:
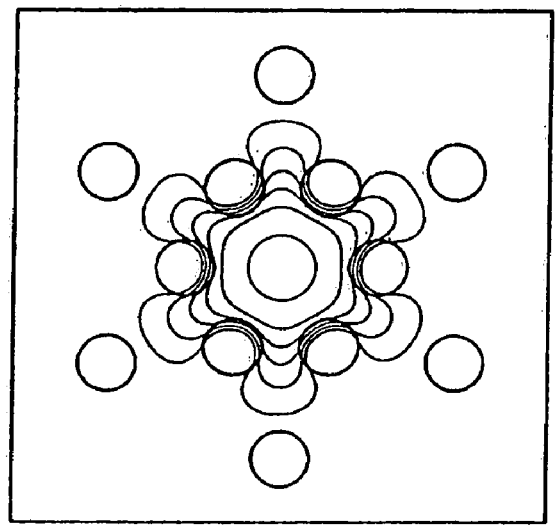
FIG. 9 is a graph showing a power distribution of the fundamental mode of a 12-hole type fiber according to an exemplary embodiment of the present invention at a wavelength of 1.55 µm.

These results can be verified through theoretical calculations. FIG. 8 shows a power distribution of the fundamental mode in the 18-hole type Fiber 1 shown in FIG. 2 at a wavelength of 1.55 μm, and FIG. 9 shows a power distribution of the fundamental mode in the 12-hole type Fiber 2 shown in FIG. 7 at a wavelength of 1.55 μm. In these FIGS. 8 and 9, the spacing between the contour lines is 10 dB. The power distributions shown in FIG. 8 and FIG. 9 are almost the same, indicating that the outer holes omitted from Fiber 2 do not function significantly.

Figure 10:
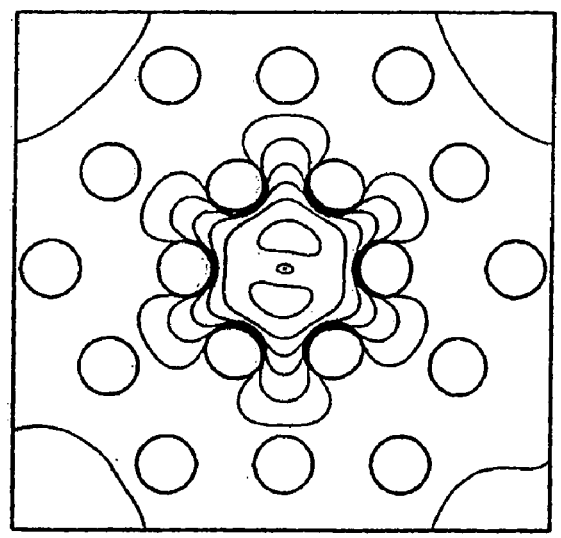
FIG. 10 is a graph showing the power distribution of a higher-order mode of a conventional 18-hole type fiber at a wavelength of 1 µm.
Figure 11:
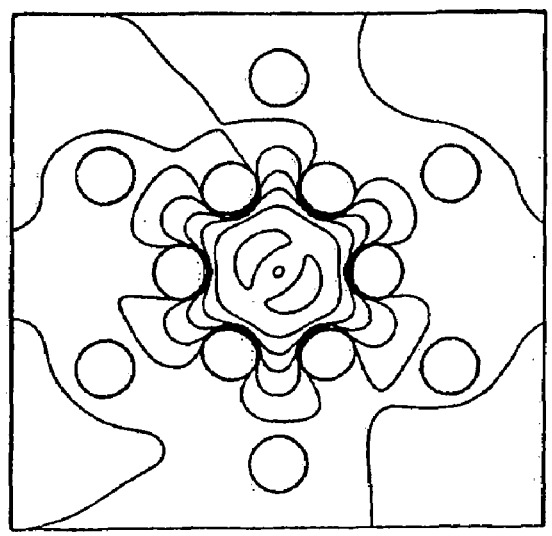
FIG. 11 is a graph showing the power distribution of a higher-order mode of a 12-hole type fiber according to an exemplary embodiment of the present invention at a wavelength of 1 µm.

Similarly, FIG. 10 and FIG. 11 show power distributions of a higher-order mode in the 18-hole type Fiber 1 and the 12-hole type Fiber 2 at a wavelength of 1 μm, respectively. In these FIGS. 10 and 11, the spacing between the contour lines is also 10 dB. As shown in these figures, the principal portion of the higher-order mode is distributed in a manner similar to that of the fundamental mode, indicating that the outer holes omitted from Fiber 2 do not function significantly.

EXAMPLE 5

A fiber having the structure shown in FIG. 2 (Fiber 3) and another fiber having the structure shown in FIG. 7 (Fiber 4) were fabricated, which were similar except for the number of holes. Both Fibers 3 and 4 had a core region with a refractive index difference with respect to pure silica Δ of 0.34% and a diameter D of 8.5 μm, and holes with a diameter $d_1$ and $d_2$ of 4.2 μm, a distance $\Lambda_1$ between the center of an inner hole and the center of the core region of 9.0 μm, and a distance $\Lambda_2$ between the center of an outer hole and the center of the core region of 14.0 μm. Fiber 3 included six inner holes and 12 outer holes, having 18 holes in total, whereas Fiber 4 included six inner holes and six outer holes, having 12 holes in total. As shown in FIG. 7, the six outer holes of Fiber 4 were provided at regions in which inner holes are absent when viewed from the center of the core region.

Higher-order mode cut-off wavelengths were measured at about 1.28 μm for Fiber 3 and about 1.26 μm for Fiber 4, and bending loss with a bending diameter φ of 10 mm at a wavelength of 1.55 μm was measured at about 1.5 dB/m for Fiber 3 and about 1.7 dB/m for Fiber 4. The two fibers exhibited almost substantially similar optical characteristics.

Furthermore, fusion splice loss with an SMF having a conventional step-shaped core (D=8.5 μm and Δ=0.34%) was measured at about 0.05 dB in both cases, and mechanical splice loss with the same fiber was measured at about 0.20 dB at a wavelength of 1.55 μm in both cases. Return loss was measured at about 45 dB or more at a wavelength of 1.55 μm in both cases.

Furthermore, when two HAHFs were spliced, fusion splice loss was measured at about 0.10 dB and mechanical splice loss was measured at about 0.25 dB at a wavelength of 1.55 μm loss in both cases. Return loss was measured at about 45 dB or more in both cases.

Figure 12:
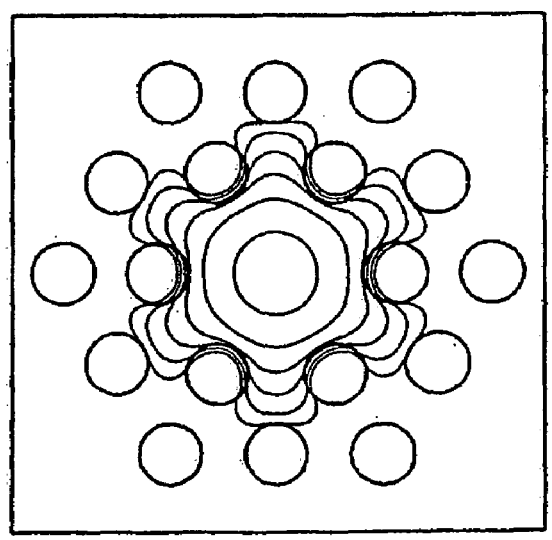
FIG. 12 is a graph showing a power distribution of the fundamental mode of a conventional 18-hole type fiber at a wavelength of 1.55 µm.
Figure 13:
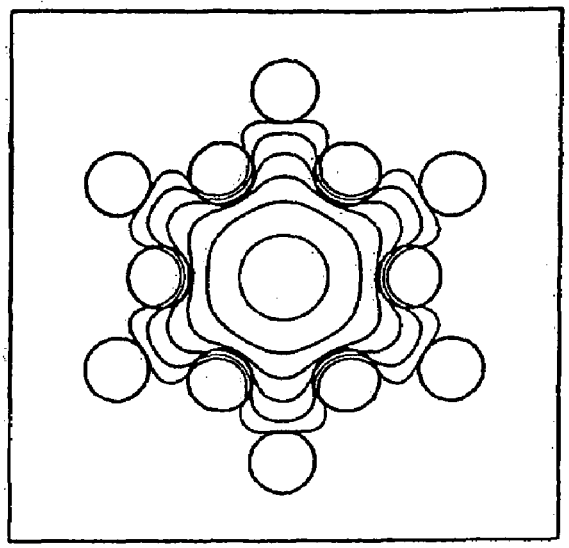
FIG. 13 is a graph showing a power distribution of the fundamental mode of a 12-hole type fiber according to an exemplary embodiment of the present invention at a wavelength of 1.55 µm.

FIG. 12 shows a power distribution of the fundamental mode in the 18-hole type Fiber 3 at a wavelength of 1.55 μm, and FIG. 13 shows a power distribution of the fundamental mode in the 12-hole type Fiber 4 at a wavelength of 1.55 μm. In these FIGS. 12 and 13, the spacing between the contour lines is 10 dB. The power distributions shown in FIG. 12 and FIG. 13 are almost the same, indicating that the outer holes omitted from Fiber 4 do not function significantly.

Figure 14:
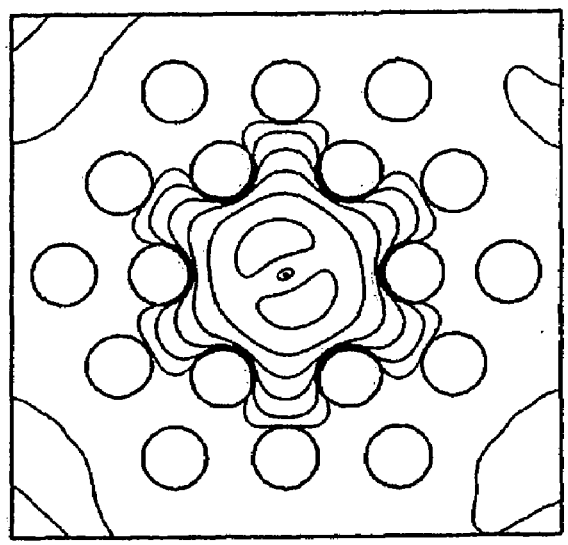
FIG. 14 is a graph showing the power distribution of a higher-order mode of a conventional 18-hole type fiber at a wavelength of 1 µm.
Figure 15:
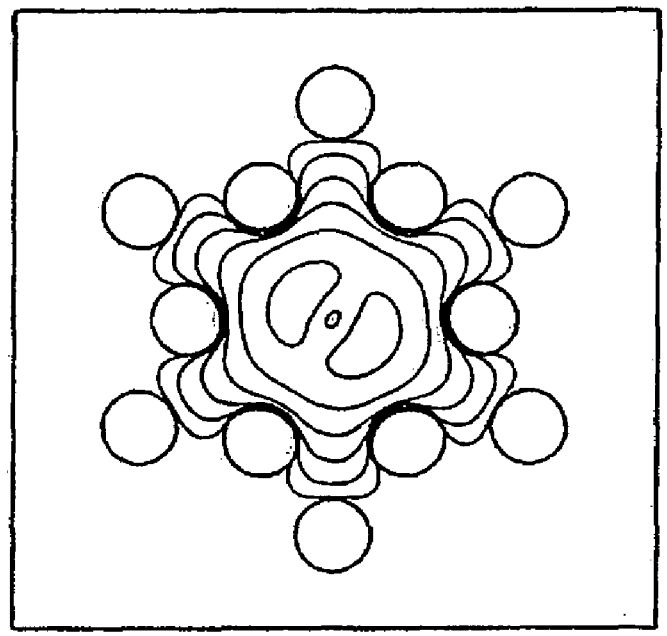
FIG. 15 is a graph showing the power distribution of a higher-order mode of a 12-hole type fiber according to an exemplary embodiment of the present invention at a wavelength of 1 µm.

Similarly, FIG. 14 and FIG. 15 show power distributions of a higher-order mode in the 18-hole type Fiber 3 and the 12-hole type Fiber 4 at a wavelength of 1 μm, respectively. In these FIGS. 14 and 15, the spacing between the contour lines is also 10 dB. As shown in these figures, the principal portion of the higher-order mode is distributed in a manner similar to that of the fundamental mode, indicating that the outer holes omitted from Fiber 4 do not function significantly.

Figure 16:
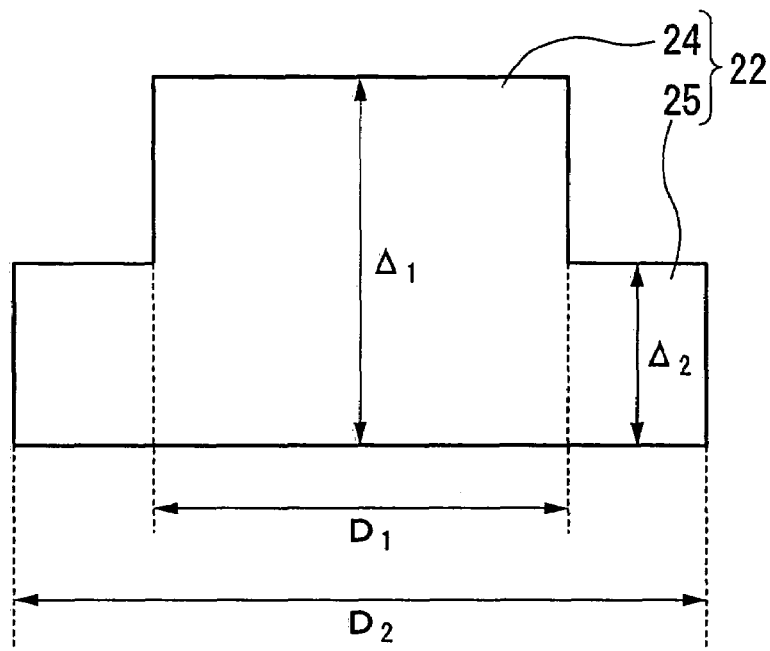
FIG. 16 is a graph showing the refractive index profile at a core region of a low-bending loss multimode holey fiber according to an exemplary embodiment of the present invention.
Figure 17:
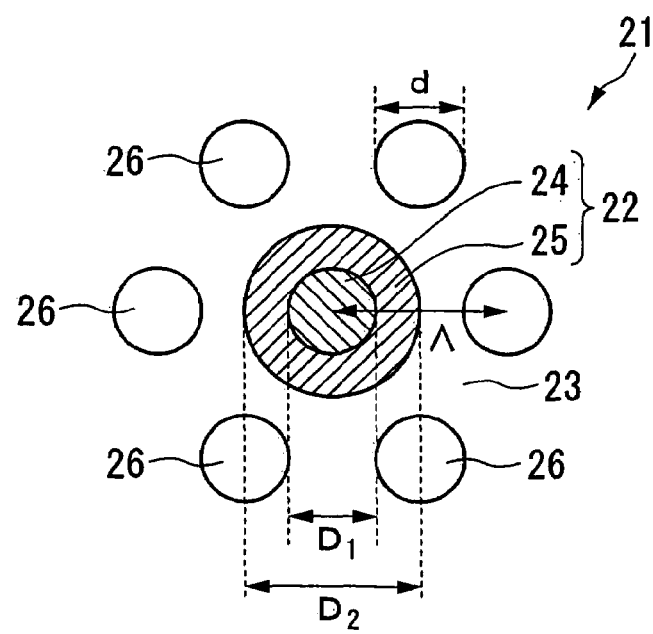
FIG. 17 is a schematic diagram illustrating a fifth exemplary embodiment of a holey fiber according to the present invention.

FIG. 16 and FIG. 17 are schematic diagrams illustrating a fifth exemplary embodiment of a holey fiber (hereinafter abbreviated as "HF") according to the present invention. FIG. 16 is a graph illustrating a refractive index profile of a core region 22 of the HF, and FIG. 17 is a schematic diagram showing the structure of the HF 21. In these figures, reference numeral 21 notes the HF, reference numeral 22 denotes a core region, reference numeral 23 denotes a cladding region, reference numeral 24 denotes a first core, reference numeral 25 denotes a second core, and reference numerals 26 denote holes.

The HF 21 of this exemplary embodiment is made of silica-based glass, and is a holey fiber that includes a core region 22 having a higher refractive index than that of the cladding region 23 and a plurality of holes 26 around the core region 22. The core region 22 includes a first core 24 at the center that is made of a material having a higher refractive index than that of the cladding region 23, and a second core 25 around the first core 24, which is made of a material having a refractive index that is different from a refractive index of the first core 24 and is higher than that of the cladding region 23. The HF 21 of this exemplary embodiment has a structure in which six holes 26 forming a single layer are provided around the core region, as shown in FIG. 17.

In the HF 21, it is preferable that the relative refractive index difference $\Delta_1$ of the first core 24 with respect to the cladding region 23, the diameter $D_1$ of the first core 24, the relative refractive index difference $\Delta_2$ of the second core 25 with respect to the cladding region 23, and the diameter $D_2$ of the second core 25 fall within the following respective ranges: about $0.3\% \leq \Delta_1 \leq$ about 1%, about $0.1\% \leq \Delta_2 \leq$ about 0.6%, about 4 μm $\leq D_1 \leq$ about 10 μm, and about 6 μm $\leq D_2 \leq$ about 15 μm.

When the above-described $\Delta_1$, $\Delta_2$, $D_1$, and $D_2$ are in the above-described ranges, it is possible to obtain an HF 21 that has bending loss of about 0.1 dB/m or less with a bending diameter φ of 10 mm at a wavelength of 1.55 μm.

Furthermore, it is also possible to obtain an HF 21 that has two or more propagation modes at wavelengths between about 1.2 μm and about 1.6 μm (this number of propagation modes is the number without a degenerate mode that is counted more than once), and the absolute value of a group refractive index difference $\Delta n_g$ between the fundamental mode and the next higher-order mode of less than about $1 \times 10^{-3}$.

Furthermore, it is possible to obtain an HF 21 that exhibits modal dispersion due to multimode propagation of about 0.5 ns/km or less when the HF 21 is spliced with an SMF having a step-shaped refractive index profile.

When splicing in this manner, it is also possible to obtain an HF 21 that exhibits fusion splice loss between the HF 21 and the SMF of about 0.2 dB or less, mechanical splice loss of about 0.4 dB or less, and return loss of about 40 dB or more at a wavelength of 1.55 μm.

Furthermore, when fusion splicing two HFs 21, it is also possible to obtain an HF 21 that exhibits a fusion splice loss of about 0.2 dB or less, mechanical splice loss of about 0.4 dB or less when optical connectors are provided to ends of the HFs 21 and the connectors are made to abut each other, and return loss of about 40 dB or more at a wavelength of 1.55 μm.

In this HF 21, the core region 22 surrounded by the holes includes the first core 24 at the center that is made of a material having a higher refractive index than that of the cladding region 23, and a second core 25 around the first core 24, which is made of a material having a refractive index that is different from a refractive index of the first core 24 and is higher than that of the cladding region 23. Thus, it exhibits extremely low bending loss even with a very small bending radius.

This HF 21 has a simplified structure and exhibits very low bending loss, and can be connected with a conventional SMF with very low splice loss. Thus, it can be applied to house wiring in which flexibility of wiring and ease of installation are required, thereby improving the performance of optical communication.

The arrangement of the holes of an HF of the present invention is not limited to six holes in one layer according to the above-described fifth exemplary embodiment, and other arrangements may be employed. However, it is preferable that the number of layers of the holes surrounding the core region 22 be two or less, the holes in each layer be arranged evenly spaced, and the number of holes in each layer be between 3 and 8. Hereinafter, other arrangements of the holes will be illustrated in additional exemplary embodiments.

Figure 18:
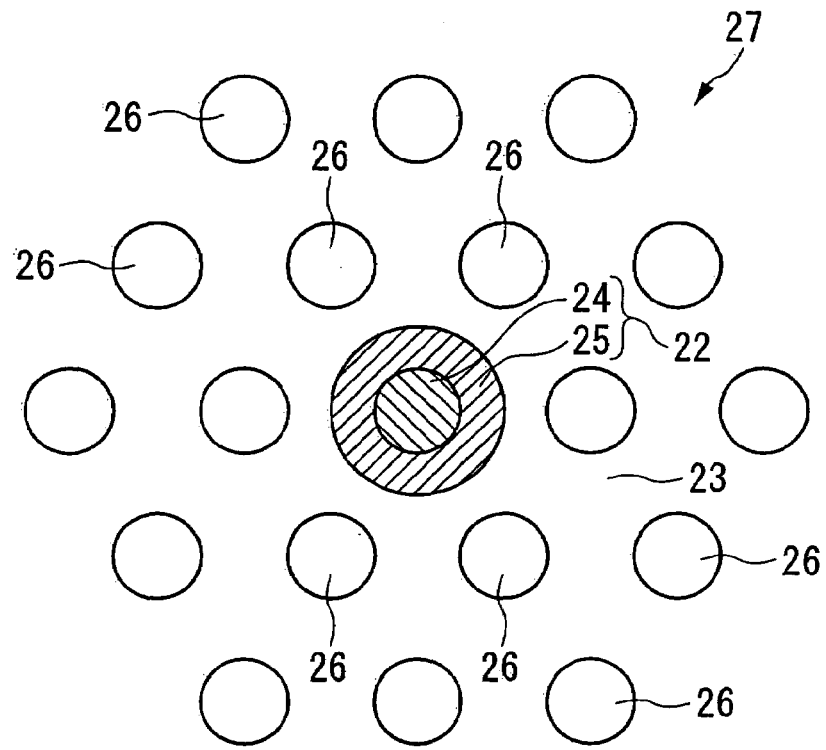
FIG. 18 is a schematic diagram illustrating a sixth exemplary embodiment of a holey fiber according to the present invention.

FIG. 18 is a diagram illustrating a sixth exemplary embodiment of the HF according to the present invention. The HF 27 of this exemplary embodiment is constructed to have the same elements as those of the HF 21 of the above-described fifth exemplary embodiment, and to further include twelve holes 26 that define a second layer around the six holes 26 that define the first layer. Thus, there are a total of eighteen holes 26 in the two layers.

The HF 27 of this exemplary embodiment is capable of providing the same effects as those of the HF 21 of the above-described fifth exemplary embodiment.

Figure 19:
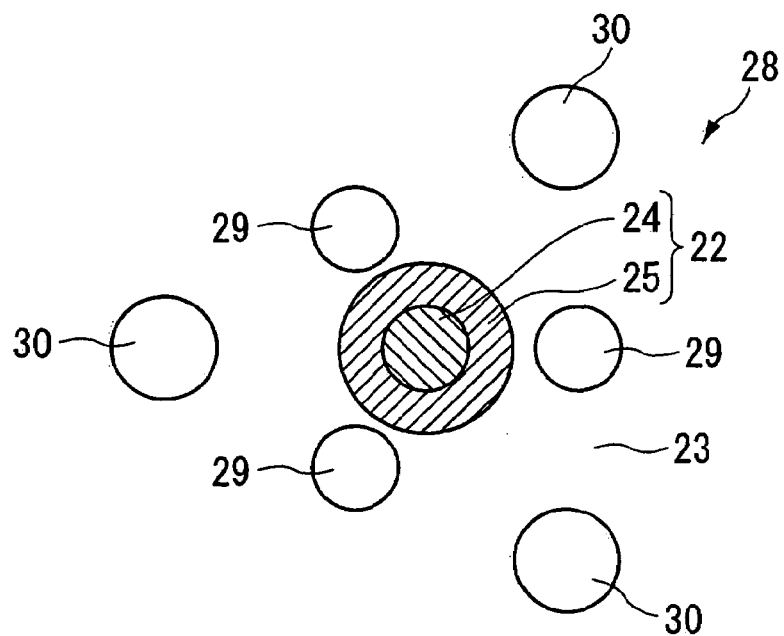
FIG. 19 is a schematic diagram illustrating a seventh exemplary embodiment of a holey fiber according to the present invention.

FIG. 19 is a diagram illustrating a seventh exemplary embodiment of the HF according to the present invention. An HF 28 of this exemplary embodiment is characterized in that it includes a core region 22 having the first core 24, the second core 25 provided therearound, similar to the HF 21 of the above-described fifth exemplary embodiment, and the two layers (the inner and outer layers) of holes 29 and 30 surrounding the core region 22. The hole diameter of the inner holes 29 is different from the hole diameter of the outer holes 30. There are three inner holes 29 and three outer holes 30 (a total of six holes in the two layers), and the three holes in each layer have the same hole diameter and the same distance from the core center to the center of the hole.

The HF 28 of this exemplary embodiment is capable of providing the same effects as those of the HF 21 of the above-described fifth exemplary embodiment.

Figure 22:
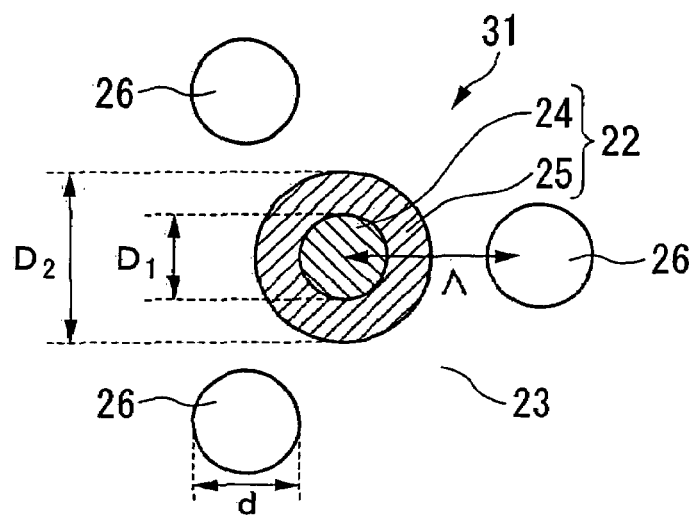
FIG. 22 is a schematic diagram illustrating an eighth exemplary embodiment of a holey fiber according to the present invention.

FIG. 22 is a diagram illustrating a seventh exemplary embodiment of the HF according to the present invention. The HF 31 of this exemplary embodiment includes a core region 22 having the first core 24, the second core 25 provided therearound, similar to the HF 21 of the above-described fifth exemplary embodiment, and three holes 26 surrounding the core region 22 (three holes in one layer).

The HF 31 of this exemplary embodiment is capable of providing the same effects as those of the HF 21 of the above-described fifth exemplary embodiment.

EXAMPLE 6

Figure 20:
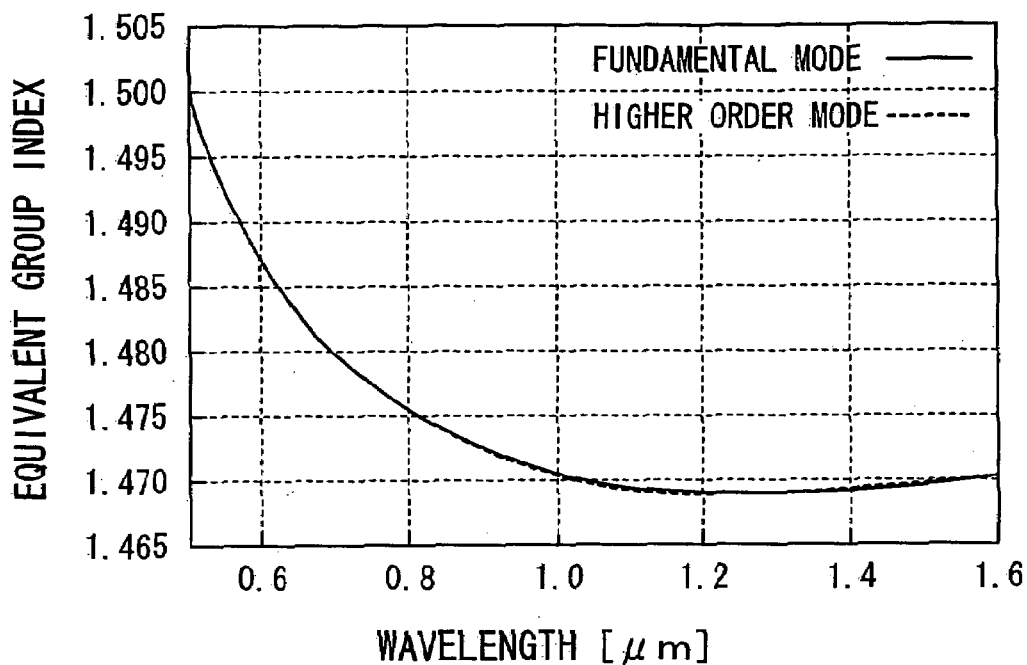
FIG. 20 is a graph showing results of Example 6 according to an exemplary embodiment of the present invention.

The HF 21 shown in FIG. 17 having six holes in one layer, and having the refractive index profile shown in FIG. 16; a core region with $D_1=6$ μm, $D_2=12$ μm, $\Delta_1=0.5\%$, and $\Delta_2=0.3\%$; a hole diameter "d" of 9 μm; and a distance $\Lambda$ from the center of the core region to the center of a hole of 13 μm was fabricated. The measurement results of equivalent group refractive indices in the fundamental mode and a higher-order mode of this HF 21 are shown in FIG. 20. As shown in the figure, the group refractive index difference $\Delta n_g$ ($|n_{gf}-n_{gh}|$) between the two modes was about $2\times10^{-4}$ or lower at wavelengths between about 1.2 and about 1.6 μm, wherein $n_{gf}$ and $n_{gh}$ represent group refractive indices of the fundamental mode and the higher-order mode, respectively. Furthermore, the upper limit of an increase in pulse signals caused by modal dispersion due to multimode propagation can be evaluated using the following Equation (1):

$$\Delta\tau = \frac{L}{c}\Delta n_g \qquad (1)$$

In the above Equation, L represents the propagation distance and "c" represents the speed of light. In this case, degradation of signals due to modal dispersion is about 0.7 ns/km or less. Since a fiber is used after being connected with an SMF in actual application, higher-order modes are not substantially pumped at all. Therefore, the actual degradation of signals due to modal dispersion was about 0.1 ns/km or less.

The test-fabricated HF 21 exhibited bending loss of about 0.02 dB/m with a bending diameter ϕ of 10 mm at a wavelength of 1.55 μm. Furthermore, when the holes 26 in HF 21 were collapsed upon fusion splicing, HF 21 could be connected with an SMF with very low loss since it has a mode field diameter (MFD) of about 10 μm at a wavelength of 1.55 μm, which is a comparable level to that of a conventional SMF. Splice loss was low at a wavelength of 1.55 μm when the HF 21 and an SMF were actually connected, with a measured fusion splice loss of about 0.1 dB and a measured mechanical splice loss of about 0.2 dB when optical connectors were provided to ends of the fibers and the connectors were made to abut each other to connect them.

EXAMPLE 7

Figure 21:
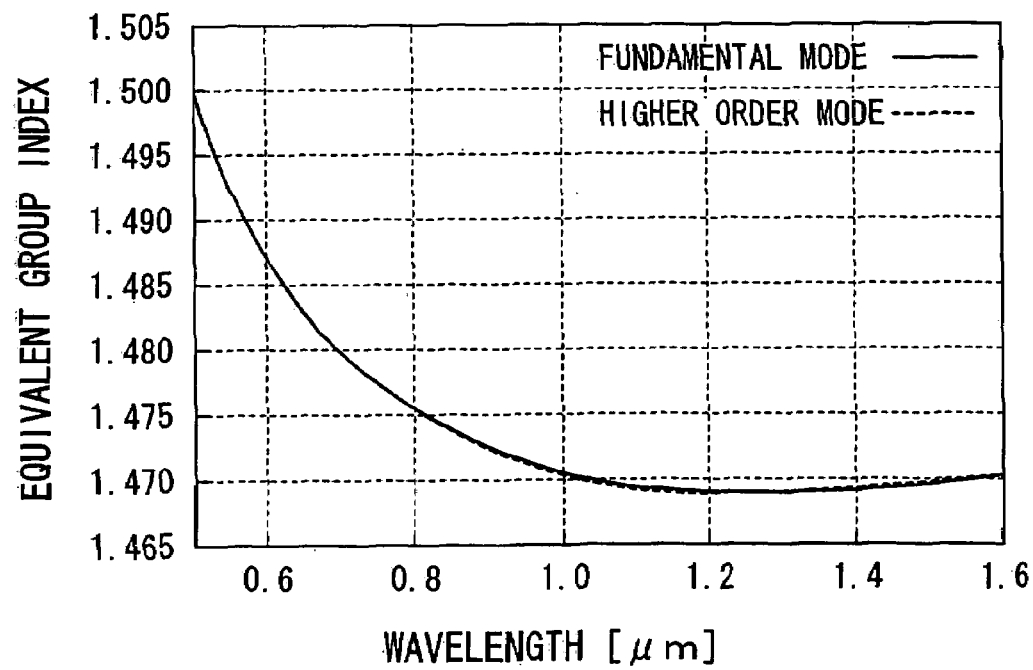
FIG. 21 is a graph showing results of Example 7 according to an exemplary embodiment of the present invention.

The HF 21 shown in FIG. 17 having six holes in one layer, and having the refractive index profile shown in FIG. 16; a core region with $D_1=5.6$ μm, $D_2=11.2$ μm, $\Delta_1=0.5\%$, and $\Delta_2=0.3\%$; a hole diameter "d" of 7 μm; and a distance $\Lambda$ from the center of the core region to the center of a hole of 11 μm was fabricated. The measurement results of equivalent group refractive indices in the fundamental mode and a higher-order mode of this HF 21 are shown in FIG. 21. As shown in the figure, the group refractive index difference $\Delta n_g$ between the two modes was about $3\times10^{-4}$ or lower at wavelengths between about 0.2 and about 1.6 μm. Actual degradation of signals due to modal dispersion was about 0.1 ns/km or less.

The test-fabricated HF 21 exhibited bending loss of about 0.02 dB/m with a bending diameter ϕ of 10 mm at a wavelength of 1.55 μm. Furthermore, splice loss was low at a wavelength of 1.55 μm, with a measured fusion splice loss of about 0.2 dB and a measured mechanical splice loss of about 0.3 dB when optical connectors were provided to ends of the fibers and the connectors were made to abut each other to connect them.

EXAMPLE 8

Figure 23:
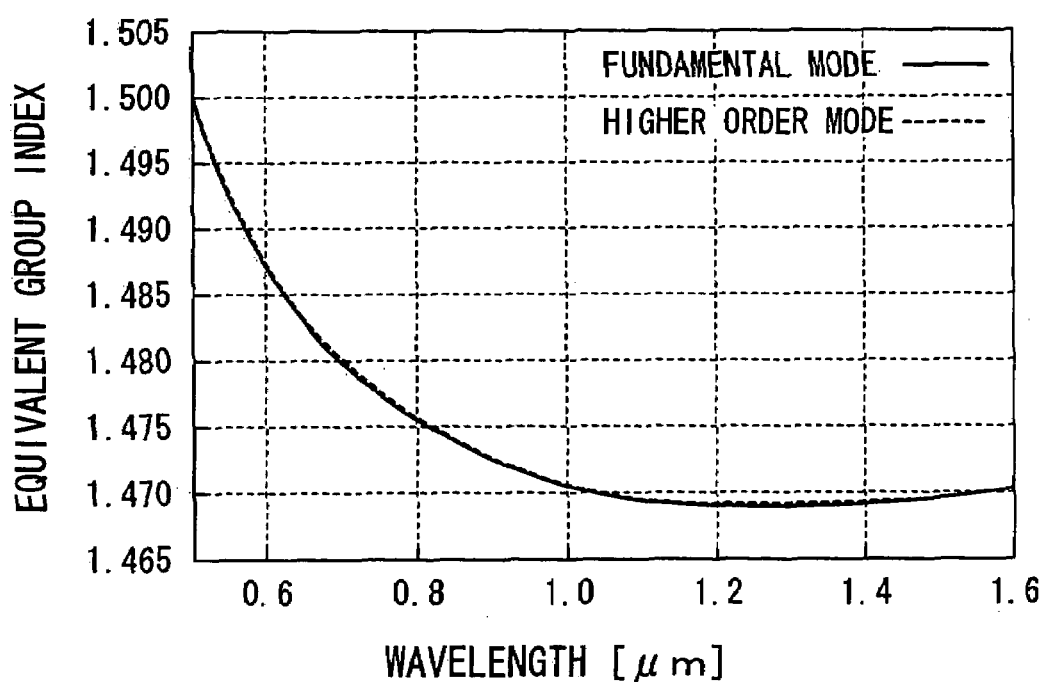
FIG. 23 is a graph showing results of Example 8 according to an exemplary embodiment of the present invention.

The HF 31 shown in FIG. 22 having six holes in one layer, and having the refractive index profile shown in FIG. 16; a core region with $D_1=6$ μm, $D_2=12$ μm, $\Delta_1=0.5\%$, and $\Delta_2=0.3\%$; a hole diameter "d" of 10 μm; and a distance $\Lambda$ from the center of the core region to the center of a hole of 12 μm was fabricated. The measurement results of equivalent group refractive indices in the fundamental mode and a higher-order mode of this HF 31 are shown in FIG. 23. As shown in the figure, the group refractive index difference $\Delta n_g$ between the two modes was about $1\times10^{-4}$ or lower at wavelengths between about 1.2 and about 1.6 μm.

Actual degradation of signals due to modal dispersion was about 0.1 ns/km or less.

The test-fabricated HF 31 exhibited bending loss of about 0.03 dB/m with a bending diameter φ of 10 mm at a wavelength of 1.55 μm. Furthermore, splice loss was low at a wavelength of 1.55 μm, with a measured fusion splice loss of about 0.1 dB and a measured mechanical splice loss of about 0.2 dB when optical connectors were provided to ends of the fibers and the connectors were made to abut each other to connect them.

While preferred exemplary embodiments of the invention have been described and illustrated above, it should be understood that these are examples of the invention and are not to be considered as limiting. Additions, omissions, substitutions, and other modifications can be made without departing from the spirit or scope of the exemplary embodiments of the present invention as defined in the following claims.

What is claimed is:

1. A hole-assisted holey fiber, comprising:
   a core region;
   a cladding region provided around the core region; and
   a plurality of holes that are provided in the cladding region around the core region,
   wherein a refractive index of the core region is higher than that of the cladding region, the plurality of holes form two layers comprising an inner hole layer and an outer hole layer, the inner hole layer has the same number of holes as the number of the holes in the outer hole layer, the holes of the outer hole layer are provided in locations in which holes of the inner hole layer are absent when viewed from the center of the core region, holes of the outer hole layer have equal diameters and holes of the inner hole layer have equal diameters, a distance $\Lambda_1$ from a center of the core region to a center of a hole of the inner hole layer and a distance $\Lambda_2$ from the center of the core region to a center of a hole of the outer hole layer satisfy $\Lambda_1 < \Lambda_2$, and a diameter $d_1$ of a hole of the inner hole layer and a diameter $d_2$ of a hole of the outer layer satisfy $d_1 \leq d_2$.

2. The hole-assisted holey fiber according to claim 1, wherein the numbers of holes in the inner hole layer and the outer hole layer each range between 3 and 8.

3. The hole-assisted holey fiber according to claim 1, wherein a cut-off wavelength $\lambda_C$ of the hole-assisted holey fiber in a higher-order mode is shorter than about 1.3 μm and a bending loss $L_B$ with a bending diameter φ of 10 mm at a wavelength of 1.55 μm is lower than about 2.5 dB/m.

4. The hole-assisted holey fiber according to claim 1, wherein a fusion splice loss and a mechanical splice loss with a single-mode fiber having a step-shaped core are about 0.2 dB or less and about 0.5 dB or less, respectively, at a wavelength of 1.55 μm.

5. The hole-assisted holey fiber according to claim 4, wherein the core region of the hole-assisted holey fiber has the same structural parameters as those of a core of the single-mode fiber.

6. A hole-assisted holey fiber, comprising:
   a core region;
   a cladding region provided around the core region; and a plurality of holes that are provided in the cladding region around the core region,
   wherein a refractive index of the core region is higher than that of the cladding region, the plurality of holes define two or more layers comprising an inner hole layer and an outer hole layer, a distance $\Lambda_i$ from a center of the core region to a center of a hole of an inner hole layer and a distance $\Lambda_j$ from the center of the core region to a center of a hole of an outer hole layer satisfy $\Lambda_i < \Lambda_j$, and a diameter $d_i$ of a hole of an inner hole layer and a diameter $d_j$ of a hole of an outer hole layer satisfy $d_i \leq d_j$ (where "i" and "j" are ascending numeric orders of the hole layers counted from the center, and i<j), holes of an outer hole layer are provided in locations in which holes of an inner hole layer are absent when viewed from the center of the core region, and holes defining the same layer have the same diameter.

7. The hole-assisted holey fiber according to claim 6, wherein the numbers of holes in the respective hole layers range between 3 and 8.

8. The hole-assisted holey fiber according to claim 6, wherein a cut-off wavelength $\lambda_C$ of the hole-assisted holey fiber in a higher-order mode is shorter than about 1.3 μm and a bending loss $L_B$ with a bending diameter φ of 10 mm at a wavelength of 1.55 μm is lower than about 2.5 dB/m.

9. The hole-assisted holey fiber according to claim 6, wherein a fusion splice loss and a mechanical splice loss with a single-mode fiber having a step-shaped core are about 0.2 dB or less and about 0.5 dB or less, respectively, at a wavelength of 1.55 μm.

10. The hole-assisted holey fiber according to claim 9, wherein the core region of the hole-assisted holey fiber has the same structural parameters as those of a core of the single-mode fiber.

11. A multimode holey fiber comprising:
    a core region;
    a cladding region around the core region; and
    a plurality of holes that are provided in the cladding region around the core region,
    wherein the core region has a higher refractive index than that of the cladding region, the core region comprises a first core at a center that is made of a material having a higher refractive index than that of the cladding region, and a second core around the first core, which is made of a material having a refractive index that is different from a refractive index of the first core and higher than that of a material of the cladding region.

12. The multimode holey fiber according to claim 11, wherein a relative refractive index difference $\Delta_1$ of the first core with respect to the cladding region, a diameter $D_1$ of the first core, a relative refractive index difference $\Delta_2$ of the second core with respect to the cladding region, and a diameter $D_2$ of the second core fall within the following ranges: about $0.3\% \leq \Delta_1 \leq about$ 1%, about $0.1\% \leq \Delta_2 \leq about$ 0.6%, about 4 μm≦about 10 μm, and about 6 μm≦$D_2$≦about 15 μm.

13. The multimode holey fiber according to claim 11, having two or more propagation modes at wavelengths between about 1.2 μm and about 1.6 μm (the number of propagation modes being the number without a degenerate mode that is counted more than once), wherein an absolute value of a group refractive index difference $\Delta n_g$ between a fundamental mode and a next higher-order mode is less than about $1 \times 10^{-3}$.

14. The multimode holey fiber according to claim 11, wherein a modal dispersion due to multimode propagation is about 0.5 ns/km or less when the low-bending loss multimode holey fiber is spliced with a single mode fiber having a step-shaped refractive index profile.

15. The multimode holey fiber according to claim 11, wherein a bending loss is about 0.1 dB/m or less with a bending diameter φ of 10 mm at a wavelength of 1.55 μm.

16. The low multimode holey fiber according to claim 11, wherein a fusion splice loss and a mechanical splice loss with a single-mode fiber having a step-shaped core are about 0.2 dB or less and about 0.4 dB or less, respectively, and a return loss is about 40 dB or more at a wavelength of 1.55 µm when the multimode holey fiber is spliced with a single-mode fiber having a step-shaped core.

17. The multimode holey fiber to claim 11, wherein a fusion splice loss and a mechanical splice loss with a single-mode fiber having a step-shaped core are about 0.2 dB or less and about 0.4 dB or less, respectively, and a return loss is about 40 dB or more at a wavelength of 1.55 µm when the multimode holey fiber is spliced with a same fiber.

18. The multimode holey fiber according to claim 11, wherein the holes surrounding the core region define two layers, the holes in each layer are arranged evenly spaced, and the number of holes in each layer is between 3 and 8.

19. The multimode holey fiber according to claim 11, wherein the plurality of holes define an inner layer and an outer layer, and a diameter of the holes of the inner layer is different from a diameter of the holes of the outer layer.

* * * * *